United States Patent
Machida et al.

[15] 3,659,186
[45] Apr. 25, 1972

[54] CONTROL AND PROTECTION ARRANGEMENT FOR A D.C. POWER TRANSMISSION SYSTEM

[72] Inventors: Takehiko Machida; Yukio Yoshida, both of Tokyo; Koji Iwata; Kenjiro Yokoyama, both of Hitachi-shi, all of Japan

[73] Assignees: Hitachi Ltd., Tokyo, Japan; Zaidan Hojin Denryoku Chuo Kenkyusho, Tokyo, Japan

[22] Filed: Aug. 28, 1969

[21] Appl. No.: 853,866

[30] Foreign Application Priority Data

Sept. 4, 1968    Japan...................43/63021

[52] U.S. Cl..................321/14, 317/31, 321/2, 321/40
[51] Int. Cl..................H02m 1/18, H02p 7/14
[58] Field of Search..................323/4, 9; 321/2, 11–14, 321/18, 38, 40; 317/31

[56] References Cited

UNITED STATES PATENTS

| | | | |
|---|---|---|---|
| 3,487,286 | 12/1969 | Persson | 321/2 |
| 3,513,353 | 5/1970 | Lansch | 317/31 |
| 3,535,591 | 10/1970 | Holmquest | 317/31 X |
| 3,383,579 | 5/1968 | Hung | 321/11 |
| 3,444,453 | 5/1969 | Peterson | 321/11 |
| 3,458,795 | 7/1969 | Ainsworth | 321/13 X |
| 3,501,685 | 3/1970 | Reese et al | 321/2 |

Primary Examiner—William H. Beha, Jr.
Attorney—Craig, Antonelli, and Hill

[57] ABSTRACT

A current from a power transmission line is smoothed by a filter and then compared with a set value to detect and control the transmission current when the transmission current is in the neighborhood of the setpoint. Whereas, the current is directly detected and controlled to the set value without intervening the filter when the deviation rapidly increases.

4 Claims, 6 Drawing Figures

INVENTORS
TAKEHIKO MACHIDA, YUKIO YOSHIDA,
KOJI IWATA and KENJIRO YOKOYAMA

BY Craig, Antonelli, Stewart + Hill
ATTORNEYS

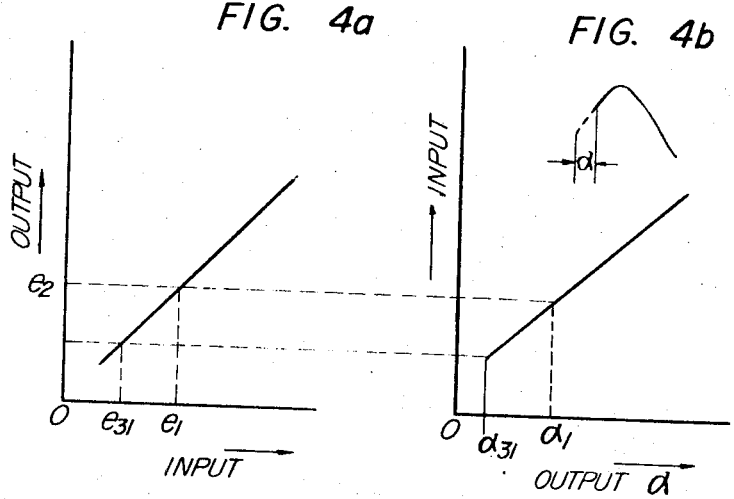
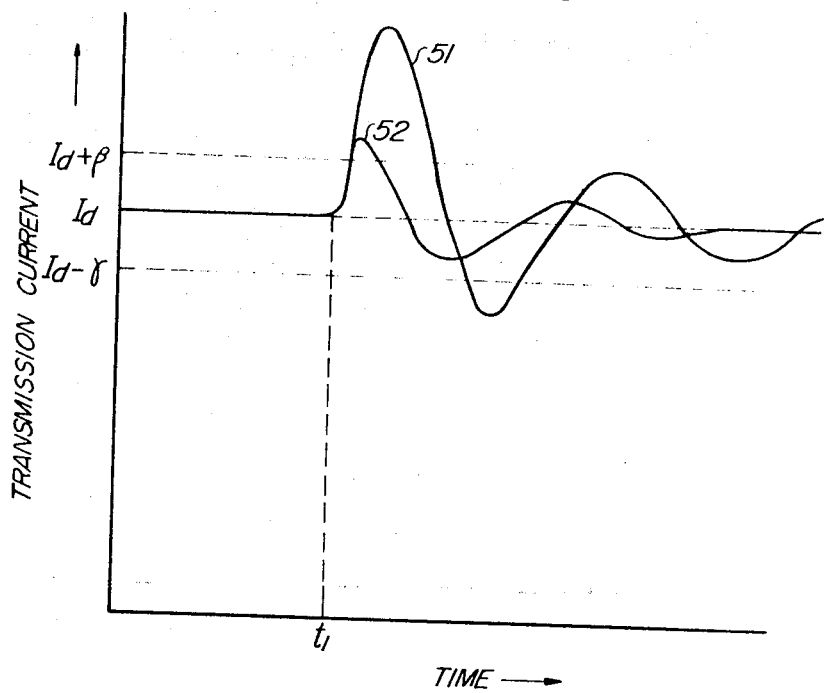

CONTROL AND PROTECTION ARRANGEMENT FOR A D.C. POWER TRANSMISSION SYSTEM

In automatic control systems, it is naturally preferable that the temporary value of a controlled variable always coincide with the setpoint. It is also required at the same time that the automatic control system should be stable, i.e. the automatic control system should have little response to minute deviations, especially ripples. For this reason, the detection of a controlled variable is usually done through a filter in automatic control systems.

When a filter is used in the detection of a controlled variable, however, it gives some delay in the response of the control system depending on the time constant. Such delay may sometimes allow the controlled variable to go beyond the permissible value.

As an example, a d.c. power transmission system will be described hereinafter. In a d.c. power transmission, system for example, the transmission current is controlled to a constant value on the rectifier side. In this case, the current flowing through a transmission line is detected and compared with the setpoint to control the rectifier by the deviation from the setpoint. But, since a transmitted current usually has ripple components, detection is done through a filter to avoid the influence of these ripple components. The time constant of such a filter is of the order of 100 to 200 milli-seconds. Thus, if there occurs such a commutation failure of the power inverter that allows an excessive current to suddenly flow through the transmission line, it will naturally take about 100 to 200 milli-seconds for the control system to detect it and respond to the excessive current. That is, before the control system begins to work, an excessive current flows for several to ten and several Hz of a.c. power. When the rectifier is formed by a thyristor, an excessive current for such time is enough to cause break down. Therefore, it is necessary to provide a separate protection means to cut off such an excessive transmission current to protect the rectifier. But if such an excessive current can be controlled to a normal value at most in 1 Hz., there is no need to stop the transmission and when the inverter has recovered to a normal state, then normal transmission will continue.

As is described above, it is required for an automatic control system to be quickly responsive to excessive deviations as well as to be stable against minute deviations.

This invention is designed to satisfy such a requirement and provides a control and protection system for a d.c. power transmission system comprising a usual feedback loop and another feedback loop having little time delay. This invention also provides a control and protection system particularly useful for d.c. power transmission.

According to one feature of this invention, controlling action begins immediately after the controlled variable goes beyond the upper or the lower limit of the setpoint.

Other features and advantages of this invention will be made clear in the following description made in connection with the accompanying drawings in which:

FIGS. 4a and 4b illustrate the input-output characteristics of the amplifier and the phase shifter of an embodiment of this invention; and FIG. 5 illustrates the manner of control of this invention in comparison with that of a conventional system.

Figure 1:
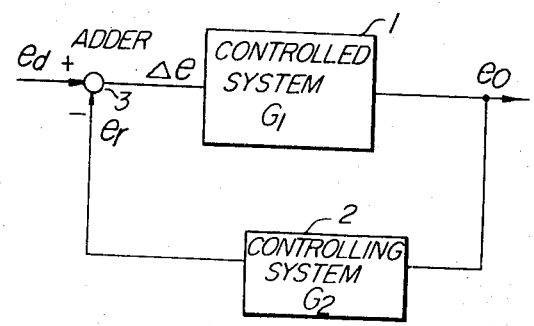
FIG. 1 is a block diagram illustrating the structure of a conventional automatic control system.

FIG. 1 illustrates the construction of a conventional automatic control system comprising a controlled system 1 including machine, process, or the like, and a feedback system 2 including detector, filter, amplifier, or the like. Reference characters $G_1$ and $G_2$ designate the transmission function of the systems 1 and 2, respectively. The output $e_r$ of the feedback system 2 is compared with the setpoint $e_d$ at an adder 3 to give the deviation $\Delta e = e_d - e_r$ as an output to the controlled system 1. The controlled value $e_o$ of the system 1 is derived by the deviation $\Delta e$. The output $e_r$ of the feedback system 2 is obtained by the measurement of controlled value $e_0$. The control system is so designed that the deviation $\Delta e$ is always zero. But since the transmission functions $G_1$ and $G_2$ usually have time constants $T_1$ and $T_2$ of some magnitude, respectively, the previously mentioned excessive current arises especially when $T_2$ is larger than $T_1$.

Figure 2:
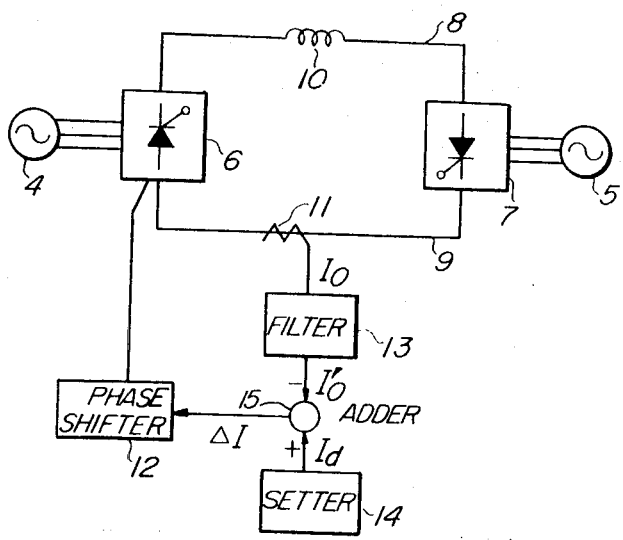
FIG. 2 is a block diagram illustrating the conventional constant current control of a power rectifier in a d.c. power transmission system.

FIG. 2 is a block diagram for illustrating the constant current control of a rectifier in a d.c. power transmission system. The system comprises two a.c. systems 4 and 5, a rectifier 6 and an inverter 7 connected to the a.c. systems 4 and 5 respectively, transmission lines 8 and 9 between the rectifier 6 and the inverter 7, a d.c. current detector 11 for detecting the current $I_o$ flowing through the transmission line 9, a filter 13 for removing ripple components from the output of the detector 11, a setter 14 for providing a setpoint, an adder 15 for comparing the output $I_o'$ of the filter 13 with the set value $I_d$, and an automatic pulse phase shifter (APPS) 12 for controlling the power rectifier 6. When this unit is operated to transmit electric power from the system 4 to the system 5, the power rectifier 6 works as an a.c.-to-d.c. converter and the inverter 7 works as a d.c.-to-a.c. converter. The automatic pulse phase shifter 12 receives the output $\Delta I = I_d - I_o'$ of the adder 15 and controls the phase of the gate pulses for the rectifier 6 to make the deviation $\Delta I$ zero. In the normal state, the input $I_o$ and the output $I_o'$ of the filter 13 corresponds to each other and there arises no problem. But when the transmission current $I_o$ is subjected to a sudden and large change and if the time constant of the feedback system including the detector 11 and the filter 13 is relatively large, there arises a possibility that the rectifier may be broken down by a large current.

Figure 3:
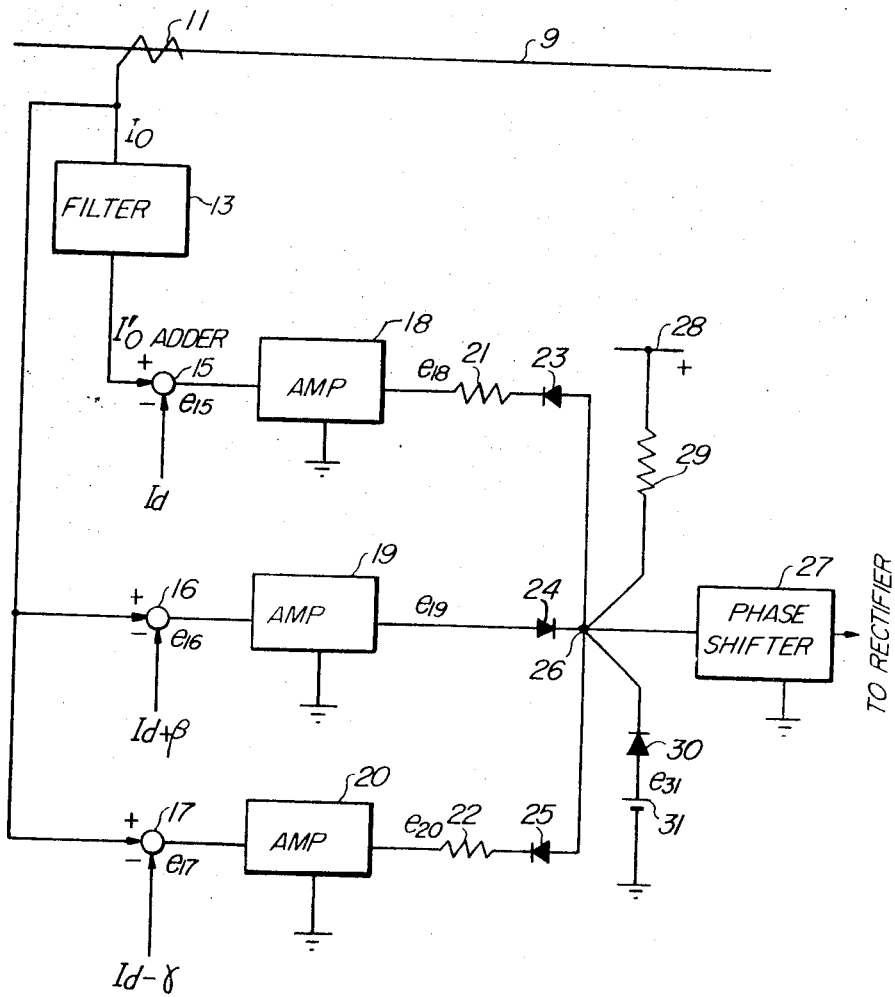
FIG. 3 is a block diagram showing the main part of an embodiment of this invention.

FIG. 3 shows the main portion of an embodiment of the invention in block diagram, which has eliminated the above drawback, in which similar reference numerals indicate the similar parts as those of FIGS. 1 and 2. In this embodiment, two subordinate feedback systems comprising adders 16 and 17, amplifiers 19 and 20, and diodes 24 and 25 are connected between the detector 11 and the automatic pulse phase shifter 27 in parallel relationship with the main feedback system comprising a filter 13, an adder 15, an amplifier 18 and a diode 23. It is to be noted that the subordinate feedback systems contain no filter. The adder 16 is supplied with a setpoint of $I_d + \beta$ and the output of the detector 11 and the adder 17 with a setpoint of $I_d - \gamma$ and the output of the detector 11, where $\beta$ and $\gamma$ are positive. The polarities of these inputs are indicated in the drawing. The amplifiers 18, 19 and 20 give a certain outputs when the output of the adders 15, 16 and 17 have a certain positive value $\Delta I'$ but give no or little output when the output of the adder is smaller than $\Delta I'$ including negative values. Resistors 21 and 22 are inserted in the output circuit of the amplifiers 18 and 20. The diodes 23, 24 and 25 are provided to selectively derive the output of the amplifiers 18, 19 and 20. The diodes 23 and 25 are connected in the same polarity and the diode 24 in an opposite polarity. The three feedback system are connected together at an interconnection point 26 and then to an automatic pulse phase shifter 27. The phase shifter 27 receives the voltage at the interconnection point 26 and drives the rectifier with a gate pulse having a phase in accordance with the voltage at the point 26. A positive power source line 28, a resistor 29, a backward current preventing diode 30, and a voltage source 31 for positive biasing are connected to the point 26, as is shown in the figure, to constitute an auxiliary circuit for affording a necessary voltage at the point 26. FIGS. 4a and 4b show the input-output characteristics of the amplifiers 18, 19 and 20 and the automatic pulse phase shifter 27. These characteristics are not restrictive but preferrable ones for the circuit shown in FIG. 3. The input of an amplifier (the output of the preceding adder) is designated as $e_1$ and the output $e_2$ which becomes the input of the phase shifter 27. The phase shifter 27 gives an output gate pulse at a time when the controlling angle is $\alpha 1$ because the output of the amplifier is $e_2$, as can be seen in FIGS. 4a and 4b.

Provided that the amplifiers and the phase shifter have such characteristics as shown in FIGS. 4a and 4b, the operation of the circuit of FIG. 3 will be as described hereinafter.

1. In the case of $I_d - \gamma < I_o < I_d = \beta$ and $I_o = I_o'$ (i.e. when the transmission current $I_o$ is approximately equal to the set value $I_d$ for a relatively long time.):

Under these conditions, the outputs $e_{15}$, $e_{16}$ and $e_{17}$ of the respective adders 15, 16 and 17 satisfy the relationships of $0 < e_{15} < e_{17}$ and $e_{16} < 0$. Therefore, the outputs $e_{18}$, $e_{19}$ and $e_{20}$ of the respective amplifiers 18, 19 and 20 satisfy the relationships of $e_{18} < e_{20}$ and $e_{19} \approx 0$. Thus, the phase shifter 27 is supplied with the output $e_{18}$ of the amplifier 18 through the diode 23 to control the rectifier so as to attain the relation of $I_o = I_d$.

2. In the case of $I_o < I_d + \beta$ (i.e. when an excessive current suddenly flows):

Just after the realization of this state, the output $I_o'$ of the filter 13 still remains at the level of the preceeding state. Therefore, the relationships of $e_{15} < e_{16}$ as well as $0 < e_{16}$ may appear if the transmission current $I_o$ becomes suddenly large enough. In such a case, the output $e_{19}$ of the amplifier 19 becomes larger than the output $e_{18}$ of the amplifier 18. Thus, the phase shifter 27 is supplied with the output $e_{19}$ through the diode 24 to make the control angle $\alpha$ larger so as to decrease the transmission current $I_o$. At this moment, the input $e_{17}$ of the amplifier 20 becomes larger and gives no influence to the phase shift control because the output $e_{20}$ of the amplifier 20 is blocked by the diode 25.

3. In the case of $I_o < I_d - y$ (i.e. when the transmission current suddenly decreases:

Just after the realization of this state, the output $I_o'$ of the filter 13 still remains at the level of the preceeding state, similar to the case (2). Thus, the relationships of $e_{16} < 0$ and $e_{17} < 0$ are realized and the relationships of $e_{19} \approx e_{20} \approx 0$ and $e_{18} < e_{20}$ may follow to trigger the diode 25. Then, the phase shifter 27 is supplied with an input of $e_{20}$. Since $e_{20} \approx 0$, the phase shifter 27 is supplied with an input of $e_{31}$ by the biasing source 31 to give control pulses of a constant control angle $\alpha_{31}$ so as to quickly recover the normal state of the transmission.

As has been described hereinabove, when the transmission current $I_o$ changes slowly enough to ignore the time constant of a filter, the primary control means including the filter operates to maintain constant current and when the transmission current rapidly becomes too large or too small, an auxiliary control means operates to bring the current to a normal value.

FIG. 5 shows the comparison of the responses of a conventional control system and the present control system, in which a curve 51 indicates the response of a conventional control system and 52 the response of the present control system. As is clear from FIG. 5, the flow of an excessive current can be immediately controlled to a normal value in a short period, according to this invention.

What is claimed is:

1. In a d.c. power transmission system comprising two separate power units, a rectifier and an inverter actuated by said two power units respectively, transmission lines connecting said rectifier and inverter, a detector for detecting the current flowing through the transmission line, a filter for removing ripple components from the output of the detector, and a phase shifter for controlling the control angle of the rectifier to have a phase corresponding to the deviation of the output of the filter from one setpoint, a control and protection system comprising at least one negative feedback system which compares the output of said current detector with another setpoint without the intervention of a filter to perform quick response controlling, wherein one input of a first adder is connected to the output of said filter and the other input of said first adder receives a signal representing said one setpoint, the output of said first adder being connected to the input of said phase shifter, and said one negative feedback system including a second adder having one input connected directly to the output of said current detector and a second input receiving a signal representative of said another setpoint, the output of said second adder being connected to the input of said phase shifter.

2. The combination defined in claim 1, wherein said control and protection system further includes an additional negative feedback system comprising a third adder having one input connected directly to the output of said current detector and a second input receiving a signal representative of a third setpoint, the output of said third adder being connected to the input of said phase shifter.

3. The combination defined in claim 1, wherein the output of each adder is connected to the input of said phase shifter through a respective amplifier and rectifier combination.

4. In a d.c. power transmission system comprising two separate power units, a rectifier and an inverter actuated by said two power units respectively, transmission lines connecting said rectifier and inverter, a detector for detecting the current flowing through the transmission line, a filter for removing ripple components from the output of the detector, and phase shifter means for controlling the control angle of the rectifier to have a phase corresponding to the deviation of the output of the filter from a first setpoint, the improvement comprising a control and protection system including a first negative feedback system having means for directly comparing the output of said current detector with a second setpoint without the intervention of a filter to generate a first deviation signal and amplifier means for applying said first deviation signal to said phase shifter only when said deviation signal exceeds a prescribed value in comparison to said first setpoint, and a second negative feedback system including additional means for comparing the direct output of said current detector with a third setpoint without the intervention of a filter to generate a second deviation signal and additional amplifier means for applying said second deviation signal to said phase shifter only when said second deviation signal exceeds a prescribed valve in comparison to said first setpoint.

* * * * *